United States Patent
Ullberg

[11] 3,957,385
[45] May 18, 1976

[54] TAPERED CLAMPING SLEEVE

[75] Inventor: Carl Ullberg, Katrineholm, Sweden

[73] Assignee: SKF Industrial Trading and Development Company, B.V., Jutphaas, Netherlands

[22] Filed: Apr. 9, 1974

[21] Appl. No.: 465,402

[30] Foreign Application Priority Data
May 21, 1973 Sweden .............................. 7307093

[52] U.S. Cl. .............................. 403/370; 308/236
[51] Int. Cl.² .......................................... F16C 35/06
[58] Field of Search ................ 403/370, 371, 372; 308/236

[56] References Cited
UNITED STATES PATENTS

| 851,419 | 4/1907 | Hess | 308/236 |
| 2,556,151 | 6/1951 | Bremer | 403/370 |
| 2,931,412 | 4/1960 | Wing | 308/236 |
| 3,532,402 | 10/1970 | Berry et al. | 308/236 |

FOREIGN PATENTS OR APPLICATIONS

| 928,333 | 5/1955 | Germany | 308/236 |
| 1,047,719 | 7/1953 | France | 308/236 |

Primary Examiner—Andrew V. Kundrat
Attorney, Agent, or Firm—Daniel M. Rosen

[57] ABSTRACT

A taper adapter sleeve for mounting an element with a bore, for example a roller bearing, on an axle journal or the like, characterized in that it comprises a portion, the inner and/or outer surface of which is provided about its circumference with axially directed grooves and ridges, and that the crests of said ridges define a circumscribed or inscribed cone or cylinder.

2 Claims, 5 Drawing Figures

TAPERED CLAMPING SLEEVE

BACKGROUND OF THE INVENTION

This invention relates to a tapered adapter sleeve for mounting an element with a bore, for example a roller bearing, on an axle journal or the like.

Tapered adapter sleeves are previously known, which normally are turned or bent and pressed so that the bore wall and outside surfaces are substantially smooth. Between said surfaces, the sleeve consists of solid material. Apart from a relatively large material consumption, this also implies that possibe form defects in the sleeve tend to be transferred to the element clamped on or in the sleeve. When this element is a race for a roller bearing, the properties of the bearing consequently will deteriorate. It was found that bearing rings clamped on sleeves of conventional kind, show a tendency of assuming triangular shape.

SUMMARY OF THE INVENTION

A sleeve according to the present invention, can be manufactured in a simple manner with relatively samll material consumption. Furthermore, a bearing ring or the like clamped on such a sleeve is given in principle polygonic shape which is less dependent on form defects of the sleeve and deviates less from the desired shape.

The invention is described in greater detail in the following, with reference to the accompanying drawings.

BRIEF DESCRIPTION OF THE DRAWINGS

FIG. 1b shows a section taken along lines B—B in FIG. 1a.

DETAILED DESCRIPTION OF THE PREFERRED EMBODIMENTS

Figure 1A:
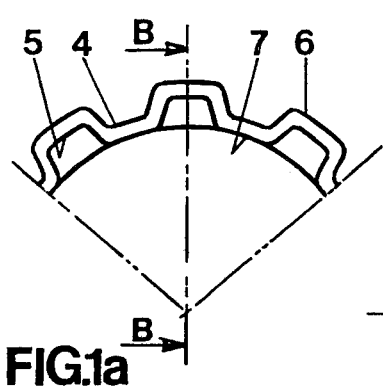
FIG. 1a shows a sector of an end view of a sleeve of this invention taken in the direction indicated by line A—A in FIG. 1b.
Figure 1B:
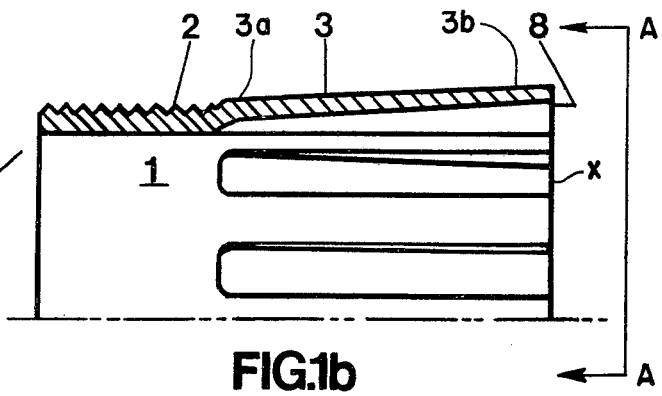

The sleeve 1, as appears from FIG. 1b, comprises at one end in a known manner a cylindrical portion with a threaded outer surface 2. The remaining part of the sleeve consists of a folded portion 3 tapered along its length as seen in FIG. 1a with a first end 3a of first outer diameter and a second end 3b of larger outer diameter. The folds have axial direction, so that in this portion of the sleeve the inner surface includes axially extending grooves or lands 4 and 5 projecting radially inward and the outer surface includes ridges or lands 6 and 7 projecting radially outward, said grooves and lands extending axially to the terminal part X of the second end 3b. As shown in the cross-sectional view of FIG. 1a, the wall thickness is substantially the same in the areas of said grooves 4 and 7, and ridges 5 and 6. The crests of the inwardly facing ridges 7 define a cylinder inscribed in the sleeve with first inner diameter dimensions corresponding to the shaft on which the sleeve is intended to be mounted. The crests of the outwardly facing ridges 6 are highest at one end surface 8 of the sleeve and decrease in height toward the threaded end portion of the sleeve, so that they define a circumscribed cone with dimensions corresponding to the taper bore in the element, in which the sleeve is intended to be mounted, e.g. an inner ring for a roller bearing.

Owing to the relatively small material thickness of the conical portion of the sleeve, the sleeve when being mounted will adjust in shape substantially to the surrounding elements, which elements substantially maintain their shape. As already mentioned, this is important when, for example, a bearing ring is mounted on the sleeve.

Figure 2A:
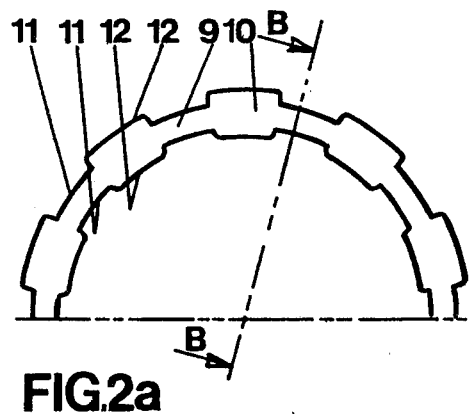
FIGS. 2a and 2b show an end view and a section respectively similar to FIGS. 1a and 1b of another sleeve embodiment of this invention, FIG. 2b taken in the direction indicated by line B'—B' in FIG. 2b.
Figure 2B:
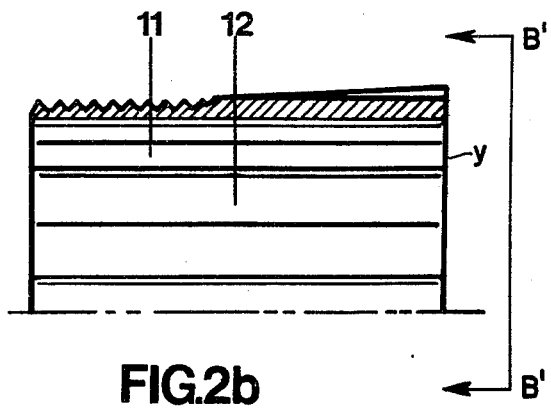

In the second embodiment shown in FIGS. 2a and 2b, the sleeve comprises alternatingly thinner and thicker portions 9 and 10, respectively, so that alternatingly grooves 11 and ridges 12 are formed in the bore wall and on the outer surface. The crests of the inwardly facing ridges define an inscribed cylinder while the crests of the outwardly facing ridges define a circumscribed cone. As appears from FIG. 2b, the inwardly facing ridges 12 preferably can extend along the whole sleeve to the terminal part Y of the second end.

Figure 3:
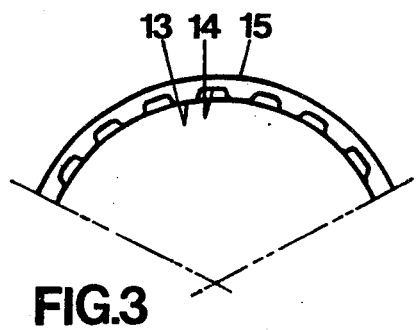
FIG. 3 shows an end view of a further embodiment of a sleeve according to this invention.

In the further embodiment shown in FIG. 3, only the bore of the sleeve is provided with ridges and grooves 13 and 14, respectively, while the outer surface 15 of the sleeve is conical. The crests of the ridges 13 define an inscribed cylinder, and the grooves 14 preferably are key-shaped, so that the material thickness between the outer surface 15 and the bottom of the grooves 14 is constant.

A sleeve according to the invention can be manufactured in a simple manner with a small material consumption. As starting material, strips may be used which are cut to desired lengths and formed into a cylindric shape by roller-bending. These cylinders are then formed by cold-pressing, so that desired portions of the sleeve are provided with the grooves and ridges intended. Thereafter, the thread is cut in a cylindric portion of the sleeve, for example by thread-rolling.

The invention, of course, is not restricted to the embodiments described above. It is possible, for example, to form the bore wall smooth and to provide only the outer surface with grooves and ridges. It is also possible to form a sleeve with a taper bore according to the invention. Also folding patterns other than that shown in FIG. 1a can be used.

I claim:

1. An adapter sleeve for use as an adapter between the bore of a bearing and a shaft on which the bearing is mounted, the adapter sleeve comprising a substantially cylindrical wall with first and second ends, the wall being tapered along its length between said first end having first outer diameter and said second end having larger outer diameter, the sleeve wall including axially extending lands which are situated around the inner and outer circumferences and alternately project radially inward and outward respectively, said wall having substantially constant thickness throughout, said inward projecting lands defining a substantially constant diameter bore of first inner diameter, said sleeve further comprising an annular portion which extends co-axially from said first end and has screw threads on its outer surface, said lands and taper extending axially to the terminal part of said second end.

2. An adapter sleeve for use as an adapter between the bore of a bearing and a shaft on which the bearing is mounted, the adapter sleeve comprising a substantially cylindrical wall with first and second ends, the wall being tapered along its length between said first end having first outer diameter and said second end having larger outer diameter, the sleeve wall including axially extending radially inward projecting lands which are uniformly spaced around the inner circumference and axially extending, radially-outward projecting lands each of which is opposite an inward projecting land such that said wall has thickness alternating between thick where there are lands and thin between said lands; said inward-projecting lands defining a substantially constant diameter bore of first inner diameter, said sleeve further comprising an annular portion which extends co-axially from said first end and has screw threads on its outer surface.

\* \* \* \* \*

UNITED STATES PATENT AND TRADEMARK OFFICE
CERTIFICATE OF CORRECTION

PATENT NO. : 3,957,385
DATED : May 18, 1976
INVENTOR(S) : Carl Ullberg

It is certified that error appears in the above-identified patent and that said Letters Patent are hereby corrected as shown below:

Column 1, line 52, "3aof" should read --3a of--.

Column 2, line 37, delete " cylindric " and substitute --cylindrical--.

Signed and Sealed this

Nineteenth Day of October 1976

[SEAL]

Attest:

RUTH C. MASON
*Attesting Officer*

C. MARSHALL DANN
*Commissioner of Patents and Trademarks*